(12) United States Patent
Weber et al.

(10) Patent No.: US 9,315,255 B2
(45) Date of Patent: Apr. 19, 2016

(54) AIRCRAFT COMPRISING A DEVICE FOR INFLUENCING THE DIRECTIONAL STABILITY OF THE AIRCRAFT, AND A METHOD FOR INFLUENCING THE DIRECTIONAL STABILITY OF THE AIRCRAFT

(75) Inventors: Carsten Weber, Bremen (DE); Markus Fischer, Weyhe (DE); Arnaud Namer, Toulouse (FR)

(73) Assignees: Airbus Operations GmbH, Hamburg (DE); Airbus Operations (S.A.S.), Toulouse (FR)

( * ) Notice: Subject to any disclaimer, the term of this patent is extended or adjusted under 35 U.S.C. 154(b) by 1013 days.

(21) Appl. No.: 13/255,246

(22) PCT Filed: Mar. 17, 2010

(86) PCT No.: PCT/EP2010/001684
§ 371 (c)(1),
(2), (4) Date: Jan. 20, 2012

(87) PCT Pub. No.: WO2010/105818
PCT Pub. Date: Sep. 23, 2010

(65) Prior Publication Data
US 2012/0104184 A1 May 3, 2012

Related U.S. Application Data

(60) Provisional application No. 61/160,745, filed on Mar. 17, 2009.

(30) Foreign Application Priority Data

Mar. 17, 2009 (DE) .......................... 10 2009 013 758

(51) Int. Cl.
*B64C 5/06* (2006.01)
*B64C 9/32* (2006.01)

(52) U.S. Cl.
CPC ... *B64C 5/06* (2013.01); *B64C 9/32* (2013.01); *Y02T 50/32* (2013.01)

(58) Field of Classification Search
CPC .................................... B64C 5/06; B64C 9/32
USPC ......................................... 244/76 C, 203, 213
See application file for complete search history.

(56) References Cited

U.S. PATENT DOCUMENTS 2,758,805 A * 8/1956 Graham .......................... 244/52
2,999,657 A 9/1961 Clark
(Continued)

FOREIGN PATENT DOCUMENTS

| CN | 101203422 | 6/2008 |
|---|---|---|
| DE | 10 2004 029 194 | 1/2006 |
| DE | 10 2009 013 758 | 9/2010 |
| GB | 746 575 | 3/1956 |
| WO | WO 2010/105818 | 9/2010 |

OTHER PUBLICATIONS

International Search Report for Application Serial No. WO 2010/105818 A3 dated Oct. 26, 2010.
(Continued)

*Primary Examiner* — Justin Benedik
(74) *Attorney, Agent, or Firm* — Jenkins, Wilson, Taylor & Hunt, P.A.

(57) ABSTRACT

An aircraft including a device for influencing the directional stability of the aircraft is provided. The device includes a control-input device; a flight control device; a sensor device for acquiring the rotation rates, including the yaw rates, of the aircraft; and at least one actuator, which is coupled with ailerons, spoilers, an elevator and a rudder. The flight control device includes a control function generating adjusting commands for the actuators for controlling the aircraft according to control commands. The aircraft includes two tail-mounted flaps, each including an actuator connected with the flight control device, situated symmetrically to each other and on opposite sides of the fuselage, and movable between retracted and extended positions. The control function is designed such that the adjusting commands that are generated on the basis of the control commands depending on the acquired rotation rates include adjusting commands to the actuators of the tail-mounted flaps.

20 Claims, 1 Drawing Sheet

(56) References Cited

U.S. PATENT DOCUMENTS

| | | | |
|---|---|---|---|
| 3,013,751 A * | 12/1961 | Scott et al. | 244/110 B |
| 3,730,460 A * | 5/1973 | Mederer | 244/53 R |
| 3,848,831 A | 11/1974 | Geary | |
| 4,645,144 A * | 2/1987 | Zupanick | 244/113 |
| 5,707,029 A * | 1/1998 | McIntosh | 244/225 |
| 6,241,183 B1 * | 6/2001 | Mathieu | 244/99.11 |
| 6,735,550 B1 | 5/2004 | Weekley et al. | |
| 7,258,307 B2 * | 8/2007 | Enzinger et al. | 244/195 |
| 7,367,530 B2 * | 5/2008 | Harrigan et al. | 244/184 |
| 2006/0284022 A1 * | 12/2006 | Harrigan et al. | 244/203 |
| 2007/0018053 A1 * | 1/2007 | Enzinger et al. | 244/195 |
| 2012/0104184 A1 | 5/2012 | Weber et al. | |

OTHER PUBLICATIONS

International Preliminary Report on Patentability and Written Opinion for Application Serial No. PCT/EP2010/001684 dated Sep. 29, 2011.

Chinese Office Action and Search Report for Application No. 201080012539.9 dated Jul. 16, 2013.

Chinese Office Action for Application No. 201080012539.9 dated Jun. 11, 2015.

European Office Action for Application No. 10 710 221.2 dated May 6, 2014.

* cited by examiner

AIRCRAFT COMPRISING A DEVICE FOR INFLUENCING THE DIRECTIONAL STABILITY OF THE AIRCRAFT, AND A METHOD FOR INFLUENCING THE DIRECTIONAL STABILITY OF THE AIRCRAFT

RELATED APPLICATIONS

The present application is a national stage entry according to 35 U.S.C. §371 of PCT application No.: PCT/EP2010/001684, which claims the benefit of the filing date of German Patent Application No. 10 2009 013 758.0 filed on Mar. 17, 2009 and of U.S. Provisional Patent Application No. 61/160,745 filed on Mar. 17, 2009, the disclosures of which applications are hereby incorporated herein by reference.

TECHNICAL FIELD

The invention relates to an aircraft comprising a device for influencing the directional stability of the aircraft, and to a method for influencing the directional stability of the aircraft, and in particular to a method for attenuating the effect of wind gusts that act on an aircraft.

BACKGROUND

From the general state of the art, for the purpose of influencing the flight state of an aircraft, it is known, in addition to usual control flaps, to use additional flaps. Of such additional flaps on an aircraft, basically the use of flaps is known that are used as pure additional drag generators or that are used to generate forces and moments.

Flaps that serve as pure drag generators are used for improved glide path control or for faster or enhanced deceleration of the aircraft either in the air or on the ground after touchdown. For example, spoilers and speed brakes that are arranged on the wing are known. Likewise, spoilers arranged on the wing, apart from their function as control devices such as flaps, are also used to reduce wing uplift and as speed brakes. Moreover, in the Space Shuttle a split rudder is used. On the aircraft types BAe 146/AVRO RJ, Blackburn B103 Buccaneer and Fokker F70/100, split flaps, arranged at the tail, are used as speed brakes.

Flaps that are provided to generate forces and moments are used to supplement the usual control flaps for controlling the aircraft. The use of such additional flaps is advantageous in the way that they directly and quickly generate forces while at the same time preventing force couplings and/or moment couplings (coupling derivatives). To this effect, generally speaking, unilaterally deflected flaps for direct force control are known, which in particular can be arranged on the aircraft such that they are blown at by the engine jet, or are not blown at by the engine jet. Such solutions are associated with a disadvantage in that they involve significant construction expenditure while at the same time providing low efficiency. Moreover, it must be taken into account that the implementation of such elements for the sole direct force control places great demands on pilots and even more so on passenger comfort. This type of control element is therefore predominantly used in the design of fighter aircraft; for example it is used in the F16.

SUMMARY

Various embodiments of the invention provide a device on an aircraft, by means of which device the directional stability can be influenced and hence yaw control be improved, which device involves only relatively modest design-related and system-technology-related expenditure.

Further embodiments of the invention provide a method for influencing the directional stability of the aircraft and in particular to provide a method to reduce the effect of wind gusts acting on an aircraft, by means of which method wind gust compensation can be achieved with relatively modest design-related and system-technology-related expenditure.

According to embodiments of the invention, an aircraft comprising a device for influencing the directional stability of the aircraft is provided, which aircraft comprises: a main wing with ailerons and spoilers, optionally a horizontal or an elevator tailplane comprising an elevator and a vertical tail unit with a rudder, with the device for influencing the directional stability of the aircraft comprising:

a control-input device for entering control demands or control commands for controlling the flight path of the aircraft,
a flight control device that is functionally connected with the control-input device,
a sensor device that is functionally connected with the flight control device, for acquiring the rotation rates, including the yaw rates, of the aircraft,
in each case at least one actuator, which is functionally connected with the flight control device, for adjusting the ailerons and for adjusting the rudder,
wherein the flight control device comprises a control function that is designed in such a manner that from the control demands and the rotation rates said flight control device generates adjusting commands for the actuators for controlling the aircraft and transmits them to said actuators. According to various embodiments of the invention:
the aircraft comprises two tail-mounted flaps, each comprising an actuator that is functionally connected with the flight control device, which tail-mounted flaps are situated on opposite sides of the fuselage and are movable between a retracted and an extended position, the control function is designed in such a manner that for lateral control of the aircraft the adjusting commands that are generated on the basis of the control demands or control commands and depending on the acquired rotation rates comprise adjusting commands for adjusting the actuator of at least one of the tail-mounted flaps for their actuation.

Thus the control function is in particular designed in such a manner that for lateral control of the aircraft on the basis of the control commands, depending on the acquired rotation rates, adjusting commands for transmission to the actuator of at least one of the tail-mounted flaps are generated for actuation of said tail-mounted flaps and are transmitted to said actuator.

In this arrangement the control function can be designed in such a manner that for lateral control of the aircraft the adjusting commands that are generated on the basis of the control commands depending on the acquired rotation rates, said control function at least in some sections at the same time generates adjusting commands to the actuator of a rudder in order to at the same time in a period of time move at least one of the tail-mounted flaps and the rudder.

As an alternative or in addition, the control function can be designed in such a manner that for lateral control of the aircraft the adjusting commands that are generated on the basis of the control commands depending on the acquired rotation rates, said control function at least in some sections at the same time generates adjusting commands to the actuator of at least one aileron and/or to the actuator of at least one spoiler in order to at the same time in a period of time move at least one of the tail-mounted flaps and at least one aileron and/or at least one spoiler so as to rotate the aircraft on its vertical axis.

According to a further example embodiment of the invention, the control function is designed in such a manner that for lateral control of the aircraft the adjusting commands that are generated on the basis of the control commands depending on the acquired rotation rates comprise adjusting commands to the actuator of the rudder and at least in some sections at the same time comprise adjusting commands to the actuator to both of the tail-mounted flaps for their actuation in order to rotate the aircraft on its vertical axis. In this arrangement it can, in particular, be provided for the deflection angle of the first tail-mounted flap that is situated on the side towards which the aircraft due to the control command is to turn to be at least 10% greater than the deflection angle of the second tail-mounted flap.

According to a further example embodiment of the invention, the control function comprises an operating mode that is designed in such a manner, in which operating mode the adjusting commands for the actuators for the tail-mounted flaps are generated at double the amplification factor of the adjusting commands for the rudder.

According to a further example embodiment of the invention, in one operating mode the control function is designed in such a manner that for lateral control of the aircraft the adjusting commands that are generated on the basis of the control commands and depending on the acquired rotation rates comprise adjusting commands to the actuator of the rudder and at least in some sections at the same time comprise adjusting commands to the actuator of at least one of the tail-mounted flaps for their actuation, in which adjusting commands in each case a tail-mounted flap is deflected symmetrically to the rudder in order to rotate the aircraft around its vertical axis.

According to a further example embodiment of the aircraft according to the invention, the axis of rotation of the tail-mounted flaps can be arranged behind the axis of rotation of the rudder in relation to the longitudinal axis of the aircraft.

According to a further example embodiment of the aircraft according to the invention, said aircraft can comprise an elevator, wherein the tail-mounted flaps are arranged below the elevators in relation to the vertical axis of the aircraft. In an alternative example embodiment of the aircraft according to the invention the tail-mounted flaps of the aircraft can also be arranged above the elevators.

The aircraft can furthermore comprise an elevator, wherein the tail-mounted flaps are arranged in such a manner that their axes of rotation extend behind the axis of rotation of the elevators in relation to the longitudinal axis of the aircraft. The axes of rotation of the tail-mounted flaps extend along the vertical axis of the aircraft and generally in an angular range that extends between +/−45 degrees to the vertical axis of the aircraft.

The tail-mounted flaps can furthermore in particular be designed in such a manner that the exterior shells of the tail-mounted flaps, when viewed in circumferential direction of the fuselage, form a complete fuselage section when the tail-mounted flaps are in their stowed positions.

Moreover, in a further example embodiment, the aircraft can comprise a tail-mounted engine arrangement, and in this arrangement, when viewed in longitudinal direction of the aircraft, the tail-mounted flaps can be arranged behind the engines that are arranged in the tail region and that are provided for propulsion of the aircraft.

According to a further example embodiment of the aircraft according to the invention, for noise reduction, the control function can, for example, in an operating mode for the landing approach be designed with and integrated in the sensor device, in such a manner that the control function receives sensor values relating to the flight altitude of the aircraft, and comprises a function by means of which, as soon as the aircraft descends below a predetermined flight altitude, the control function generates and transmits adjusting commands to the actuators of the tail-mounted flaps, according to which control commands both tail-mounted flaps are extended to a minimum angle predetermined by the control function.

According to a further example embodiment, in order to reduce the effect of wind gusts acting on the aircraft, the aircraft comprises:
  a sensor device that is functionally connected with the control device, for acquiring wind gusts that act on the aircraft,
  a wind-gust identification function for identifying wind gusts from the sensor values acquired by the sensor,
  a control function which, based on a determination by the wind-gust identification function that there is a wind gust, transmits adjusting commands to the respective tail-mounted flaps in order to move them in such a way that the deflections of the respective tail-mounted flaps compensate for the effect which the wind gust has on the aircraft.

In this example embodiment, the sensor device can comprise a rotation rate sensor that acquires rotations of the aircraft on its vertical axis. As an alternative or in addition, the sensor device can comprise an acceleration sensor that, for acquiring rotation of the aircraft on its vertical axis, is arranged in the front and/or rear third of the fuselage in relation to the overall length of the aircraft fuselage. Furthermore, as an alternative or in addition to these example embodiments, the sensor device can comprise at least one satellite navigation receiver that acquires accelerations or rotation rates of the aircraft.

According to a further example embodiment, for identification of wind gusts the control function of the aircraft comprises:
  a wind-gust identification function that is designed in such a manner that it determines any rise or change or increase in rotation rates and/or accelerations of the aircraft in a predetermined period of time,
  a comparison function that compares any rise or change or increase in the rotation rate of the aircraft on its vertical axis Z in a predetermined period of time with a predetermined limit value, and, if this limit value is exceeded, identifies the presence of a wind gust in response to which a countermeasure needs to be ordered,
  wherein the control function is designed in such a manner that based on the identification of a wind gust said control function determines adjusting commands corresponding to the acquired rotation rates and/or accelerations of the aircraft, and transmits them to the actuators of the tail-mounted flaps to compensate for the effects which the rotation rates and/or accelerations that occur as a result of the identified wind gust have on the aircraft. In this arrangement the control function can in particular be designed in such a manner that based on the identification of a wind gust said control function transmits adjusting commands corresponding to the progression of the wind gusts and transmits them to the actuators of the tail-mounted flaps to compensate for the rotation rates and/or accelerations that occur as a result of the identified wind gust, which rotation rates and/or accelerations act on the aircraft.

According to a further example embodiment, the control function can comprise a regulating function that converts the acquired sensor values to adjusting commands for the actuators. In this example embodiment it can, in particular, be provided for the regulating function to comprise a multidimensional table, in which table adjusting commands or amplification factors for adjusting commands are associated with rotation rates and/or accelerations, and for the control function to be designed in such a manner based on the acquired rotation rates and/or accelerations said control function determines adjusting commands and transmits the aforesaid to the actuators of the tail-mounted flaps to compensate for the rotation rates and/or accelerations that occur as a result of the identified wind gust, which rotation rates and/or accelerations act on the aircraft. The table can, in particular, be created in such a manner that the progression over time of the rotation rates and/or accelerations are associated with the adjusting commands for actuators, wherein the control function is designed in such a manner that based on acquired progressions of rotation rates and/or accelerations over time said control function determines adjusting commands for the tail-mounted flaps to compensate for the rotation rates and/or accelerations that occur as a result of the identified wind gust, which rotation rates and/or accelerations act on the aircraft, and transmits them to said tail-mounted flaps.

In the aforementioned example embodiments, the control function can be designed in such a manner that based on the acquired rotation rates and/or accelerations said control function determines adjusting commands for the tail-mounted flaps, ailerons and rudders to compensate for the rotation rates and/or accelerations that occur as a result of the identified wind gust, which rotation rates and/or accelerations act on the aircraft, and transmits said adjusting commands to the aforesaid.

Various embodiment of the invention also provide a method for influencing the directional stability of the aircraft, with the method comprising:
  inputting control specifications for controlling the flight path of the aircraft,
  acquiring rotation rates of the aircraft,
  from the control commands and the rotation rates generating adjusting commands for operating the actuators for moving control flaps of the aircraft for controlling the aircraft, and transmitting said adjusting commands for adjusting said control flaps,
  wherein for lateral control of the aircraft on the basis of the control commands and depending on the acquired rotation rates, adjusting commands to the actuator of at least one of two tail-mounted flaps arranged on the fuselage tail section of the aircraft are generated for actuation of said tail-mounted flaps, and are transmitted to the aforesaid.

Further embodiments of the invention provide a method for attenuating the effect of wind gusts that act on an aircraft, with the method comprising:
  acquiring rotation rates and/or accelerations of the aircraft in a predetermined period of time,
  identifying a wind gust that acts on the aircraft by means of a comparison function that compares any rise or change or increase in the rotation rate of the aircraft on its vertical axis Z in a predetermined period of time with a predetermined limit value and, if this limit value is exceeded, identifies the presence of a wind gust in response to which a countermeasure needs to be ordered,
  generating adjusting commands to the actuators of tail-mounted flaps to compensate for the rotation rates and/or accelerations that occur as a result of the identified wind gust, which rotation rates and/or accelerations act on the aircraft.

BRIEF DESCRIPTION OF THE DRAWINGS

Below, example embodiments of the invention are described with reference to the enclosed figures, as follows.

DESCRIPTION

Figure 1:
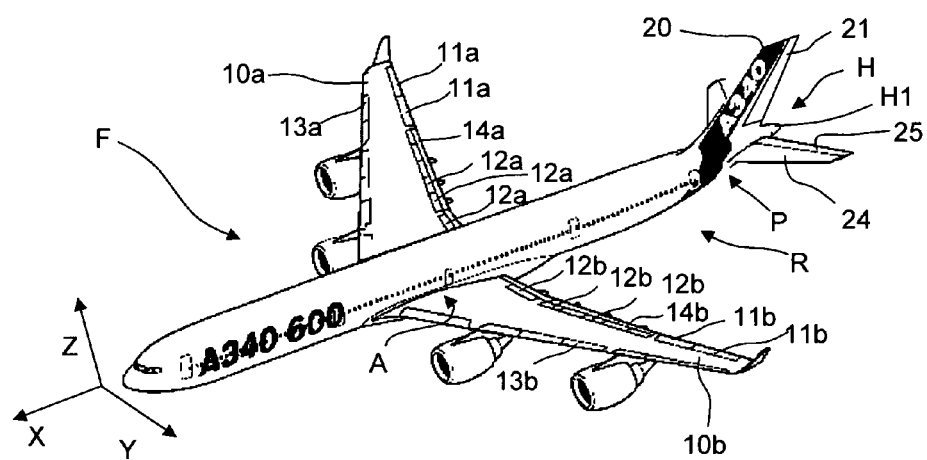
FIG. 1 shows a perspective view of an aircraft showing the location on which the tail-mounted flaps provided according to an embodiment of the invention are arranged.

FIG. 1 shows an example embodiment of a controlled aircraft F comprising two wings 10a, 10b. Each wing 10a, 10b comprises at least one aileron 11a or 11b. Optionally, the wings 10a, 10b can comprise a multitude of spoilers 12a or 12b, slats 13a, 13b and/or trailing edge flaps 14a, 14b. In FIG. 1 only some of the spoilers 12a or 12b, slats 13a, 13b and/or trailing edge flaps 14a, 14b comprise a reference character. FIG. 1 shows a coordinate system relating to the aircraft F, which coordinate system comprises a longitudinal axis X, a transverse axis Y and a vertical axis Z of the aircraft.

Furthermore, the aircraft F comprises a vertical tail unit 20 comprising at least one rudder 21. Optionally, the aircraft F can also comprise an elevator tailplane 24 with at least one elevator 25. The flap arrangement K according to various embodiment of the invention is provided at the position designated by reference character P in FIG. 1.

The elevator tailplane 24 can also be designed as a T-tail or a cruciform tail.

The aircraft F according to various embodiments of the invention can also comprise a shape that differs from that of the aircraft shown in FIG. 1. For example, the aircraft according to various embodiments of the invention can also be a high-wing aircraft or a blended wing body. Moreover, the aircraft can be an aircraft that comprises canards instead of an elevator tailplane.

The device, provided according to an embodiment of the invention, for influencing the directional stability of the aircraft F comprises a control-input device (not shown in FIG. 2) for inputting control demands in the form of control commands for controlling the flight path of the aircraft, as well as a flight control device 50 that is functionally connected with the control-input device. The control-input device can in particular comprise the pilot-input means such as a control stick and optionally also pedals.

The aircraft F or the device for influencing the directional stability of said aircraft further comprises a sensor device (not shown in FIG. 2) that is functionally connected with the flight control device 50 for acquiring the rotation rates including the yaw rates of the aircraft. To this effect the flight control device 50 comprises a receiving device for receiving the sensor values acquired by the sensor device and transmitted to the flight control device 50. The sensor device comprises sensors and in particular inertial sensors for acquiring the rotation rates of the aircraft. The inertial sensors can in particular be part of the inertial sensor system for controlling the flight position of the aircraft. Furthermore, the sensor device can comprise air data sensors for determining the dynamic pressure, the static pressure and the temperature of the air flowing around the aircraft. The control flaps, such as the spoilers 12a or 12b, slats 13a, 13b, trailing edge flaps 14a, 14b, rudders 21 and/or elevators 25, to the extent that one or several of these is/are provided, are associated with at least one actuator and/or a drive device. In particular it can be provided in each case for one of these control flaps to be associated with an actuator. Moreover, for their adjustment, several control flaps can be coupled with a shared actuator or with dedicated actuators that are driven by a drive device. This can in particular be provided in the case of slats 13a, 13b and/or trailing edge flaps 14a, 14b.

The device for influencing the directional stability of the aircraft F in each case comprises at least one actuator that is functionally connected with the flight control device, which actuator is arranged on the ailerons 11a, 11b and on the rudder 21 and generally on the ailerons 11a, 11b, the spoilers 12a or 12b, the elevator 25 and/or the rudder 12 in order to adjust the aforesaid.

The flight control device 50 comprises a control function that receives control commands from the control-input device, and receives sensor values from the sensor device, and in particular rotation rates acquired from said sensor device. The control function is designed in such a manner that depending on the control commands and on the acquired and received rotation rates it generates adjusting commands for the actuators and transmits these to said actuators so that, as a result of actuating the actuators, control of the aircraft F according to the control commands is effected.

According to various embodiments of the invention, the aircraft comprises two tail-mounted flaps K1, K2. Each tail-mounted flap K1, K2 is associated with at least one actuator 61, 62 which in each case is functionally connected with the flight control device 50 by way of connecting lines 50a or 50b. By way of a bearing device on the fuselage R of the aircraft F the tail-mounted flaps K1, K2 are coupled so as to be movable between a retracted and an extended position. The tail-mounted flaps K1, K2 are arranged on opposite sides of the fuselage and in their retracted positions are arranged so as to be symmetrical to each other relative to the vertical axis. In each case the bearing device forms an axis of rotation for moving the tail-mounted flaps K1, K2. The actuators 61, 62 are designed in such a manner and are coupled to the tail-mounted flaps K1, K2 in such a manner that corresponding to the actuation of the actuators by means of the flight control device 50 said tail-mounted flaps K1, K2 are adjusted between a retracted and an extended position.

According to an example embodiment, the tail-mounted flaps K1, K2 that are provided, and optionally, to the extent that the aircraft is equipped with them, the ailerons, rudder, elevators and/or spoilers are used to compensate for the effects of wind gusts.

Figure 2:
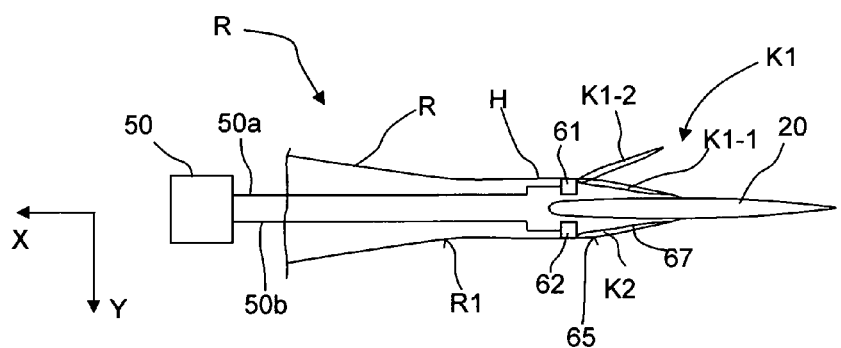
FIG. 2 shows a diagrammatic top view of the tail region of an aircraft, showing two tail-mounted flaps provided according to an embodiment of the invention, wherein the tail-mounted flap that is arranged on one side of the tail region is shown in its extended state, and the tail-mounted flap that is arranged on one side of the tail region is shown in its retracted state.

The axis of rotation of each tail-mounted flap K1, K2 is designed in such a manner that the tail-mounted flaps K1, K2 in their retracted positions rest against the fuselage R, while in their extended positions they protrude outwards from the exterior skin R1 of the fuselage R (reference character K1-2 in FIG. 2). The axes of rotation of the tail-mounted flaps K1, K2 thus extend along the vertical axis Z of the aircraft. In this context, the expression "along the vertical axis Z of the aircraft" denotes that the axes of rotation have a directional component in the vertical axis Z of the aircraft rather than mandatorily extending in the direction of the vertical axis Z of the aircraft. The axes of rotation of the tail-mounted flaps extend in particular in an angular range that extends between +/−45 degrees to the vertical axis of the aircraft. In this arrangement the axes of rotation of the tail-mounted flaps K1, K2 can also extend obliquely to the X-Z-plane and/or to the Y-Z-plane. According to one embodiment of the invention, several tail-mounted flaps with axes of rotation that are aligned differently to each other can be provided on each side of the aircraft.

Additionally or alternatively, the axis of rotation of each tail-mounted flap K1, K2 arranged on opposite sides of the fuselage can be provided depending on their function to be achieved, the axis of rotation of each tail-mounted flap K1, K2 can run along the longitudinal direction of the fuselage.

The tail-mounted flaps K1, K2 are in particular designed in such a manner that their outsides 67 at the respective retracted position of the tail-mounted flap K1, K2 form a continuation or supplementation of the exterior skin R1 of the fuselage R in the region of the respective tail-mounted flap K1, K2. In its extended position, in which the respective tail-mounted flap K1, K2 projects outwards from the exterior skin R1 of the fuselage R, said tail-mounted flap K1, K2 projects into the air that flows around the fuselage R, in order to influence the flow at this position and in order to exert forces and moment on the aircraft F in flight, in order to implement the control commands.

FIG. 2 shows the first of the two tail-mounted flaps K1, K2 both in a retracted state (reference characters K1-1 in FIG. 2) and in an extended state (reference characters K1-2 in FIG. 2). The tail-mounted flaps K1, K2 can in particular be designed in such a manner that their outsides or exterior shells 67 with an edge contour line 65 form part of the exterior skin R1 of the fuselage R. In the retracted position of the tail-mounted flaps K1, K2 said tail-mounted flaps K1, K2 thus do not influence the flow around the fuselage R. In this example embodiment, the tail-mounted flaps K1, K2 thus comprise partial exterior shells of the fuselage R.

In this arrangement it can in particular be provided for the exterior surface of the fuselage on the symmetry plane of the aircraft (X-Z-plane) to be divided into two halves, each comprising an exterior shell of a tail-mounted flap K1, K2. In this case, with the tail-mounted flaps in their closed positions, the exterior shells of the tail-mounted flaps K1, K2, viewed in circumferential direction of the fuselage, form a complete fuselage section. In this arrangement the tail-mounted flaps thus form half a circumferential section of the corresponding fuselage section. The tail-mounted flaps can also be designed in such a manner that they do not completely form half the circumference of a fuselage section, but instead that their upper edge line or lower edge line, relative to the vertical axis Z, in sections forms the uppermost line or lowermost line of the respective fuselage section. These example embodiments can in particular be provided if the tail-mounted flaps K1, K2 form the fuselage section which is situated in front of the tail cone H1 when viewed in longitudinal direction X of the aircraft.

The tail-mounted flaps K1, K2 are situated in the region of the tail H of the aircraft fuselage R, in other words generally behind the connecting region A relative to the longitudinal axis X of the aircraft, by way of which connecting region the wings 10a, 10b are connected with the fuselage R. In addition, it can be provided for the axis of rotation of the tail-mounted flaps K1, K2 to be arranged behind the axis of rotation of the rudder 21 relative to the longitudinal axis X of the aircraft F.

If the aircraft F comprises an elevator 25 and in particular a vertical tail unit, as an alternative or in addition it can be provided for the tail-mounted flaps K1, K2 to be arranged below the elevators 25 relative to the vertical axis Z of the aircraft F. As an alternative or in addition it can further be provided for the tail-mounted flaps K1, K2 to be arranged in such a manner that their axes of rotation extend behind the axis of rotation of the elevators 25 relative to the longitudinal axis X of the aircraft F.

According to various embodiments of the invention, the control function is designed in such a manner that the adjusting commands that are generated on the basis of the control commands depending on the acquired rotation rates comprise adjusting commands to the actuators of the rudder, and at least in some sections at the same time comprise adjusting commands to the actuators 61, 62 of the tail-mounted flaps K1, K2 for their actuation.

The control function is in particular designed in such a manner that it generates adjusting commands which depending on the flight state to be achieved provide for a one-sided, symmetrical or asymmetrical deflection of the two tail-mounted flaps K1, K2.

For example, for lateral control or for generating lateral forces it can be provided for only one of the tail-mounted flaps K1, K2 to be deflected. As a result of deflection of only one of the tail-mounted flaps K1, K2, on the fuselage side on which deflection of the tail-mounted flap situated thereon takes place, additional drag is generated which in turn as a result of its lever effect normally to the centre of gravity generates a moment on the vertical axis Z of the aircraft, and consequently generates a yaw movement of the aircraft. Furthermore, as a result of such one-sided deflection of a tail-mounted flap a pressure field in the region of the nearby vertical tail unit is generated in such a manner that on the vertical tail unit a force is generated which by way of its lever effect normally to the centre of gravity of the aircraft generates a moment on the vertical axis Z of the aircraft. This moment causes a yaw movement that is aligned in the same direction as the previously described drag formation, thus reinforcing said drag formation.

The control function can in particular be designed in such a manner that for lateral control of the aircraft F or for achieving lateral movement of the aircraft F said control function generates adjusting commands both to the actuator of the rudder and to the actuators of both tail-mounted flaps K1, K2 by means of which it is possible to achieve deflection of the two flaps, in other words deflection of the tail-mounted flaps K1, K2 on both sides of the fuselage. As a result of this measure the ability of the vertical tail unit to generate a returning moment about the vertical axis Z of the aircraft F, in other words a moment that acts against generating a yaw movement, is considerably reduced. It is only as a result of this that the contributions of the vertical tail unit to directional stability and to yaw damping are considerably reduced. This in turn means that in particular cases the effort required to cause the aircraft to make a yaw movement can be reduced. By deflecting either one of the two tail-mounted flaps or by deflecting both tail-mounted flaps K1, K2 effects are thus achieved that generate or support rotational movement of the aircraft in the same direction about its vertical axis Z, i.e. yaw movement. As a result of both-sided deflection of the tail-mounted flaps together with deflection of the rudder in the lateral direction into which the aircraft is to be steered, yaw control of the aircraft is carried out particularly effectively. In this arrangement it can, in particular, be provided for that first one of the tail-mounted flaps K1, K2 that is situated on the side into which the aircraft F is to be steered, or towards which side the rudder 21 is deflected, is deflected to a greater extent than is the other or second tail-mounted flap. In this arrangement it can in particular be provided for the deflection angle of the first tail-mounted flap to be at least 10% greater than the deflection angle of the first tail-mounted flap.

The use of the device according to various embodiments of the invention is advantageous both for application in the low-speed range and in the high-speed range. In the high-speed range this device for influencing the directional stability of the aircraft F can in particular be used for influencing the Dutch roll behaviour of the aircraft F, because as a result of joint deflection or one-sided deflection of the tail-mounted flaps K1, K2 it is possible to influence the yawing movement due to slide separately from the rolling movement due to slide.

Furthermore, with the use of the device according to various embodiments of the invention, for influencing the directional stability of an aircraft, in particular also damping of wind gusts, above all in the low-speed range of the aircraft in flight, is achieved. According to an example embodiment of the invention, the control function is designed as part of a wind gust reduction system for reducing the effect of wind gusts in lateral direction of the aircraft F, and comprises a wind-gust compensation function. In this arrangement the device according to an embodiment of the invention comprises at least one sensor device or a sensor for acquiring wind gusts, which sensor is functionally connected with the flight control device. The sensor acquires a wind gust by acquiring the rotation of the aircraft on its vertical axis Z.

In this arrangement the control function can be designed in such a manner that from the sensor values of the sensor provided for acquiring the wind gusts, or from the progression of the sensor values of the sensor over time, said control function identifies the effect of a wind gust on the aircraft F. To this effect a wind-gust identification function can be provided which forms part of the control function or is functionally integrated in it or functionally cooperates with it. For identification of wind gusts the wind-gust identification function can be designed in particular in such a manner that it determines any rise or change or increase in the rotation rate of the aircraft on its vertical axis Z in a predetermined period of time. For this purpose the wind-gust identification function can comprise a comparison function that compares any rise or change or increase in the rotation rate of the aircraft on its vertical axis Z in a predetermined period of time with a predetermined limit value, and if this limit value is exceeded, identifies the presence of a wind gust in response to which a countermeasure needs to be ordered. In this arrangement the control function can furthermore comprise a filter by means of which the sensor values are smoothed in a suitable manner before said sensor values are analysed by the function for determining the presence or the rise of the rotation rate. As an alternative or in addition the wind-gust identification function can comprise an estimation method or a filter for identifying wind gusts based on a progression of the sensor values of the sensor provided for the acquisition of the wind gusts, which wind-gust identification function compares the progression of the sensor values with a time-dependent range within which the progression of the sensor values must be situated so that any change or progression of the sensor values is identified as having been caused by a wind gust.

In an example embodiment the sensor device can be a rotation rate sensor of an inertial sensor system, which rotation rate sensor acquires rotation of the aircraft about the vertical axis Z of the aircraft when the aircraft is subjected to a wind gust with a lateral component (Y-direction). The rotation rate sensor can be one of several inertial sensors which can in particular be components of the inertial sensor system for flight position control of the aircraft. In this arrangement the inertial sensor system can be provided to acquire wind gusts that act on the aircraft F in several directions, and in particular in the X-, Y- and Z-directions.

The sensor device can also be an acceleration sensor that is arranged in the tail region or in the front region of the aircraft. In this arrangement the acceleration sensor is arranged so as to be spaced apart from the centre of gravity of the aircraft, and can in particular be situated in the front and/or the rear third of the fuselage R relative to the overall length of the aircraft fuselage R, and can be installed in the fuselage R.

According to an example embodiment of the invention, if there is a wind gust, the control function takes the decision that a wind gust is present. Further the as well as associated sensor values or information about the sensor values, e.g. about the intensity and/or the progression of the sensor values, so that the control function on this basis generates adjusting commands to compensate for the effect which the acquired wind gust has on the aircraft F and transmits them to the actuators of the tail-mounted flaps K1, K2. According to an alternative example embodiment of the invention, the wind-gust identification function is part of the control function, and the control function, based on the decision that there is a wind gust whose effect needs to be compensated for, from the sensor values that are available to said control function and/or from the information about the sensor values generates adjusting commands to the actuators and transmits them to said actuators. The control function is functionally designed in such a manner that, based on the determination by the wind-gust identification function that there is a wind gust, said control function sends adjusting commands to the actuators 61, 62 of the respective tail-mounted flaps K1, K2, as a result of which adjusting commands the respective tail-mounted flaps K1, K2 are extended in such a manner that the movements of the respective tail-mounted flaps K1, K2 compensate for the effect the wind gust has on the aircraft. In this arrangement, e.g. that tail-mounted flap can be extended that is situated on the side of the aircraft F on which the wind gust has consequently acted on the aircraft F.

In an example embodiment the described compensation function of the control function for compensation of the effects of wind gusts acting on the aircraft can comprise a regulating function by means of which the aircraft, depending on the intensity of the rotation rate occurring in a period of time or depending on the progression of the occurring rotation rate and/or of the acceleration, associates a particular positioning command. The positioning command can also be a progression of adjusting commands over a period of time.

In this arrangement the sensor device of the wind-gust compensation system can comprise rotation rate sensors and/or acceleration sensors that are equipped in such a manner that they measure rotation rates or accelerations in several axes. Said rotation rate sensors and/or acceleration sensors can, for example, be arranged in the front third and rear third of the fuselage R and/or in the wings. As an alternative it can also be provided for the rotation rates and/or accelerations of the aircraft F to be acquired and measured with other sensors, e.g. by means of satellite navigation receivers that are installed at correspondingly spaced-apart positions on the aircraft. In these example embodiments with multidimensional acquisition of rotation rates and/or accelerations of the aircraft F the compensation function can in particular be implemented in such a manner that it receives from the sensor device the rotation rates and/or accelerations relating to three aircraft axes, and from them determines adjusting commands for actuators to compensate for the three-dimensional rotation rates and/or accelerations, and transmits these to the aforesaid. This can also be provided in the case of one-dimensional acquisition, and in particular in the case of acquisition of accelerations of a fuselage position in lateral direction, or rotary acceleration of the aircraft F on its vertical axis Z. In this arrangement the compensation function can comprise a regulating function that converts the respectively acquired or provided sensor values to adjusting commands for the actuators. The regulating function can, in particular, be stored in the form of a multidimensional table that is integrated in the compensation function, with which table for the occurrence of sensor values, in other words of rotation rates and/or accelerations, respective adjusting commands or amplification factors for adjusting commands are associated. The table is determined by means of calibration, in particular with corresponding aircraft models, and/or by means of aircraft tests. Based on the described identification of wind gusts, in this example embodiment, the compensation function determines control commands to the actuators in relation to the respectively acquired rotation rates and/or accelerations and/or optionally in relation to the respective progression over time of the rotation rates and/or accelerations, and transmits these to the actuators in order to compensate for the effects of wind gusts acting on the aircraft. In this arrangement, for compensating the effects of the wind gusts, the tail-mounted flaps K1, K2, and optionally, to the extent that the aircraft is equipped with these, the ailerons, rudders, elevators and/or spoilers are used. According to a further example embodiment, on the basis of the multidimensionally acquired rotation rates and/or accelerations it is possible to determine only adjusting commands for the tail-mounted flaps K1, K2 and to send them to the aforesaid, in order to achieve simple lateral compensation for the effects of wind gusts.

This example embodiment provides an advantage in that wind gust reduction in lateral movement or relating to multi-dimensional movements of the aircraft by means of the tail-mounted flaps can be carried out very effectively. In particular, the actuators and the tail-mounted flaps can be designed in such a manner that they can especially be retracted and extended at relatively high rotation speeds. In this arrangement it can in particular be provided for said tail-mounted flaps to be able to be moved at double the maximum rotation speed of the rudders of the aircraft.

With the device, according to various embodiments of the invention, for influencing the directional stability of the aircraft, by means of deploying the tail-mounted flaps on both sides an increase in the braking performance in flight and/or an increase in the braking performance after landing on the ground can be achieved.

By means of deflection of the tail-mounted flaps K1, K2 it is also possible to achieve an improvement of the cooling performance of thermal systems installed in the tail region, both in flight and when at a standstill on the ground.

In an aircraft comprising a tail-mounted engine arrangement, when viewed in longitudinal direction of the aircraft, the tail-mounted flaps K1, K2 can be arranged behind the engines that are arranged in the tail region and that are provided for propulsion of the aircraft. This results in rearward shielding of the noise of the engines. In this arrangement it can in particular be provided for both tail-mounted flaps K1, K2 to be in an extended position during the landing approach. In this arrangement it can be provided for the control function to command activation of both tail-mounted flaps K1, K2 if the aircraft descends below a predetermined flight altitude.

In a tail-mounted engine arrangement, for improvement of the aerodynamic efficiency of the tail-mounted flaps K1, K2, it can be provided for the tail-mounted flaps K1, K2 that are arranged behind the tail-mounted engines, as well as for the engines, to be arranged and aligned in such a manner that the tail-mounted flaps K1, K2 are blown at by the engine jet from the engine that is arranged on the same side of the fuselage.

The control device or control function provided according to various embodiments of the invention can in particular form part of a flight control device of an aircraft. This can be implemented with a flight control device of the aircraft F or can be implemented as a unit that is separate from said flight control device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An aircraft comprising a device for influencing the directional stability of the aircraft, with the aircraft comprising: wings with ailerons and a rudder, with the device for influencing the directional stability of the aircraft comprising:
    a control-input device for inputting control demands for controlling the flight path of the aircraft,
    a flight control device that is functionally connected with the control-input device,
    a sensor device that is functionally connected with the flight control device, for acquiring the rotation rates, including the yaw rates, of the aircraft,
    in each case at least one actuator, which is functionally connected with the flight control device, for adjusting the ailerons and for adjusting the rudder, wherein the flight control device comprises a control function that is designed in such a manner that from the control demands and the rotation rates said flight control device generates adjusting commands for the actuators for controlling the aircraft and transmits them to said actuators, wherein:
    the aircraft comprises two tail-mounted flaps, situated behind the connecting region of the wings and on opposite sides of the fuselage, each tail-mounted flap being coupled to an actuator that is functionally connected with the flight control device for moving the tail-mounted flaps between a retracted and an extended position,
    the control function is designed in such a manner that for lateral control of the aircraft, on the basis of rotation rates about a z-axis of the aircraft acquired by the sensor device, the control function generates commands for actuating of at least one of the tail-mounted flaps and transmits the commands to said actuator for actuating the tail-mounted flaps such that a moment about the z-axis of the aircraft is effected, and
    in response to a deflection of at least one of the tail-mounted flaps, additional drag is generated which in turn generates the moment about the z-axis of the aircraft.

2. The aircraft according to claim 1, wherein the control function is designed in such a manner that for lateral control of the aircraft the adjusting commands that are generated on the basis of the control commands depending on the acquired rotation rates said control function at least in some sections at the same time generates adjusting commands to the actuator of a rudder in order to at the same time in a period of time move at least one of the tail-mounted flaps and the rudder.

3. The aircraft according to claim 1, wherein the control function is designed in such a manner that for lateral control of the aircraft the adjusting commands that are generated on the basis of the control commands depending on the acquired rotation rates, said control function at least in some sections at the same time generates adjusting commands to the actuator of at least one aileron and to the actuator of at least one spoiler in order to at the same time in a period of time move at least one of the tail-mounted flaps and at least one aileron and at least one spoiler so as to rotate the aircraft on its longitudinal axis.

4. The aircraft according to claim 1, wherein the control function is designed in such a manner that for lateral control of the aircraft the adjusting commands that are generated on the basis of the control commands depending on the acquired rotation rates comprise adjusting commands to the actuator of the rudder and at least in some sections at the same time comprise adjusting commands to the actuator to both of the tail-mounted flaps for their actuation.

5. The aircraft according to claim 4, wherein the deflection angle of the first tail-mounted flap that is situated on the side towards which the aircraft due to the control command is to turn is at least 10% greater than the deflection angle of the second tail-mounted flap.

6. The aircraft according to claim 1, wherein in one operating mode the control function is designed in such a manner that for lateral control of the aircraft the adjusting commands for the actuators that are generated on the basis of the control commands and depending on the acquired rotation rates comprise adjusting commands to the actuator of the rudder and at least in some sections at the same time comprise adjusting commands to the actuator of one of the tail-mounted flaps for their actuation, in which adjusting commands in each case a tail-mounted flap is deflected symmetrically to the rudder in order to rotate the aircraft around its vertical axis.

7. The aircraft according to claim 1, wherein the axes of rotation of the tail-mounted flaps are arranged behind the axis of rotation of the rudder in relation to the longitudinal axis of the aircraft.

8. The aircraft according to claim 1, wherein the aircraft comprises an elevator, and wherein the tail-mounted flaps are arranged in such a manner that their axes of rotation extend behind the axis of rotation of the elevators in relation to the longitudinal axis of the aircraft.

9. The aircraft according to claim 1, wherein the tail-mounted flaps are designed in such a manner that the exterior shells of the tail-mounted flaps, when viewed in circumferential direction of the fuselage, form a complete fuselage section when the tail-mounted flaps are in their stowed positions.

10. The aircraft according to claim 1, wherein the aircraft comprises a tail-mounted engine arrangement, and wherein when viewed in longitudinal direction of the aircraft the tail-mounted flaps are arranged behind the engines that are arranged in the tail region and that are provided for propulsion of the aircraft.

11. The aircraft according to claim 10, wherein for noise reduction during the landing approach the control function receives sensor values relating to the flight altitude of the aircraft, and comprises a function by means of which, as soon as the aircraft descends below a predetermined flight altitude, the control function generates and transmits adjusting commands to the actuators of the tail-mounted flaps, according to which control commands both tail-mounted flaps are extended to a predetermined minimum angle.

12. The aircraft according to claim 1, wherein, in order to reduce the effects of wind gusts acting on the aircraft, the aircraft comprises:

a sensor device that is functionally connected with the control device, for acquiring wind gusts that act on the aircraft, a wind-gust identification function for identifying wind gusts from the sensor values acquired by the sensor, a control function which based on a determination by the wind-gust identification function that there is a wind gust transmits adjusting commands to the respective tail-mounted flaps in order to move them in such a way that the deflections of the respective tail-mounted flaps compensate for the effects which the wind gust has on the aircraft.

13. The aircraft according to claim 12, wherein for identification of wind gusts the control function comprises:

a wind-gust identification function that is designed in such a manner that it determines any rise or change or increase in at least one of rotation rates and accelerations of the aircraft in a predetermined period of time, a comparison function that compares any rise or change or increase in the rotation rate of the aircraft on its vertical axis in a predetermined period of time with a predetermined limit value, and, if this limit value is exceeded, identifies the presence of a wind gust in response to which a countermeasure needs to be ordered, wherein the control function is designed in such a manner that based on the identification of a wind gust said control function determines adjusting commands corresponding to at least one of the acquired rotation rates and accelerations of the aircraft, and transmits them to the actuators of the tail-mounted flaps to compensate for the effects which at least one of the rotation rates and accelerations that occur as a result of the identified wind gust have on the aircraft.

14. The aircraft according to claim 13, wherein the control function is designed in such a manner that based on the identification of a wind gust said control function transmits adjusting commands corresponding to the progression of the wind gusts and transmits them to the actuators of the tail-mounted flaps to compensate for at least one of the rotation rates and accelerations that occur as a result of the identified wind gust, which at least one of the rotation rates and accelerations act on the aircraft.

15. The aircraft according to claim 13, wherein the control function comprises a regulating function that converts the acquired sensor values to adjusting commands for the actuators.

16. The aircraft according to claim 15, wherein the regulating function comprises a multidimensional table, in which at least one of table rotation rates and accelerations are associated with the adjusting commands or amplification factors for adjusting commands, and wherein the control function is designed in such a manner that based on at least one of respectively acquired rotation rates and accelerations it determines adjusting commands for the tail-mounted flaps to compensate for at least one of the rotation rates and accelerations that occur as a result of the identified wind gust, which at least one of the rotation rates and accelerations act on the aircraft, and transmits them to said tail-mounted flaps.

17. The aircraft according to claim 16, wherein the table allocates progressions over time of at least one of the rotation rates and accelerations to adjusting commands for actuators, and wherein the control function is designed in such a manner that based on the acquired progressions over time of at least one of the rotation rates and accelerations said control function determines adjusting commands for the tail-mounted flaps to compensate for at least one of the rotation rates and accelerations that occur as a result of the identified wind gust, which at least one of the rotation rates and accelerations act on the aircraft, and transmits said adjusting commands to the aforesaid.

18. The aircraft according to claim 13, wherein the control function is designed in such a manner that based on at least one of the acquired rotation rates and accelerations said control function determines adjusting commands for the tail-mounted flaps, ailerons and rudders to compensate for at least one of the rotation rates and accelerations that occur as a result of the identified wind gust, which at least one of the rotation rates and accelerations act on the aircraft, and transmits said adjusting commands to the aforesaid.

19. A method for influencing directional stability of an aircraft, which method comprises:

inputting control specifications for controlling a flight path of the aircraft, acquiring rotation rates of the aircraft, from control commands and the rotation rates generating adjusting commands for actuators for moving control flaps of the aircraft for controlling the aircraft, and transmitting said adjusting commands for adjusting said control flaps, on the basis of rotation rates about a z-axis of the aircraft acquired by the sensor device, the control function generating commands for actuating of at least one of the tail-mounted flaps such that for lateral control of the aircraft a moment about the z-axis of the aircraft is effected and transmitting the commands to said actuator for actuating the tail-mounted flaps, wherein as a result of a deflection of at least one of the tail-mounted flaps, additional drag is generated which in turn generates the moment about the z-axis of the aircraft.

20. A method for attenuating the effect of wind gusts that act on an aircraft, the method comprising:

acquiring at least one of rotation rates and accelerations of the aircraft in a predetermined period of time, identifying a wind gust that acts on the aircraft by a comparison function that compares any rise or change or increase in the rotation rate of the aircraft on its vertical axis in a predetermined period of time with a predetermined limit value, and, if this limit value is exceeded, identifies the presence of a wind gust in response to which a countermeasure needs to be ordered, and generating adjusting commands to the actuators of tail-mounted flaps to compensate for at least one of the rotation rates and accelerations that occur as a result of the identified wind gust, which at least one of the rotation rates and accelerations act on the aircraft, wherein as a result of a deflection of at least one of the tail-mounted flaps, additional drag is generated which in turn generates a moment about a z-axis of the aircraft.

* * * * *